United States Patent

[11] 3,602,526

| | | | |
|---|---|---|---|
| [72] | Inventor | Darrell S. Brawn | |
| | | Livonia, Mich. | |
| [21] | Appl. No. | 774,611 | |
| [22] | Filed | Nov. 12, 1968 | |
| [45] | Patented | Aug. 31, 1971 | |
| [73] | Assignee | Eaton Yale & Towne Inc. | |
| | | Cleveland, Ohio | |

[54] VEHICLE SAFETY ASSEMBLY HAVING INFLATABLE CONFINEMENT
6 Claims, 9 Drawing Figs.

[52] U.S. Cl. .................................................. 280/150
[51] Int. Cl. ....................................................... B60r 21/10
[50] Field of Search ........................................... 280/150; 244/31; 9/11; 141/286; 98/128; 222/3; 239/504

[56] References Cited
UNITED STATES PATENTS

| | | | | |
|---|---|---|---|---|
| 3,170,387 | 2/1965 | Felter | | 98/128 |
| 3,359,579 | 12/1967 | Reffell et al. | | 9/11 |
| 3,411,807 | 11/1968 | Carey et al. | | 280/150 |
| 3,414,292 | 12/1968 | Oldberg et al. | | 280/150 |
| 3,476,403 | 11/1969 | Richardson | | 280/150 |

*Primary Examiner*—Kenneth H. Betts
*Attorney*—Yount, Flynn & Tarolli

ABSTRACT: A safety assembly for protecting an occupant of a vehicle comprises an inflatable confinement having a collapsed inoperative condition and an expanded operative condition, a diffuser member, and a fluid reservoir, the confinement being inflated by the flow of fluid from the reservoir through the diffuser member into the confinement. The length of the diffuser member is relatively smaller than the length of the confinement, and the diffuser member is provided with louvered slots for distributing and preferentially directing the flow of fluid therefrom so as to increase the "effective" length of the diffuser member and to reduce the frontal velocity of the confinement as it expands.

PATENTED AUG 31 1971 3,602,526

INVENTOR.
DARRELL S. BRAWN
BY
Young, Flynn & Tarolli
ATTORNEYS

INVENTOR.
DARRELL S. BRAWN
BY
Yount, Flynn & Tarolli
ATTORNEYS

3,602,526

VEHICLE SAFETY ASSEMBLY HAVING INFLATABLE CONFINEMENT

BACKGROUND OF THE INVENTION

The assembly of the present invention is an improvement of the assembly disclosed in copending application Ser. No. 621,845, filed Mar. 9, 1967, now Pat. No. 3,411,807 in the names of Sidney Oldberg and William R. Carey for "Vehicle Safety Assembly," and assigned to the assignee of the present invention.

In application Ser. No. 621,845, there is disclosed a vehicle safety assembly comprising a confinement having a collapsed inoperative condition and an expanded operative condition, a fluid reservoir for containing a supply of fluid for expanding the confinement, means operable to provide for the flow of fluid from the reservoir, and a diffuser member located in the path of the flow of fluid from the reservoir for diffusing, distributing and directing the flow of said fluid to expand the confinement. The diffuser member has a plurality of spaced apart elongate slots having a generally rectangular shape wherein the walls of the slots are essentially perpendicular to the longitudinal axis of the diffuser. Thus, it will be noted that when the confinement is caused to expand during a crash or collision situation, the effective length of the confinement, that is, that portion of the frontal surface of the expanding confinement into which the occupant will advance and impact, travels forward to restrain the occupant of the vehicle and remains of essentially the same length as the length of the diffuser member. This is so because the fluid flowing through the diffuser member is directed by the sidewall configuration of the slots to flow essentially perpendicular to the longitudinal axis of the diffuser member as the fluid passes through the slots.

It is evident from the foregoing that in order for the vehicle safety assembly of application Ser. No. 621,845 to be effective to restrain the occupant who may be seated anywhere along the width of the vehicle, the inflatable confinement must be mounted in a relatively large area within the dash panel of the vehicle and/or within the steering column of the vehicle such that the overall length of the confinement when expanded shall correspond substantially to the width of the vehicle. In the practice of the invention of U.S. application Ser. No. 621,845, it has been found that the space within the dash panel or steering column in which the vehicle safety assembly may be mounted is extremely limited and may not permit the use of a diffuser having a length substantially the same as the required length of an effective confinement when inflated. Thus, in order to provide for a vehicle safety assembly having a confinement possessing the necessary length requirements to effectively restrain the occupants of the vehicle, yet capable of being stored within the available limited space, it is necessary to provide a confinement which, when expanded, is sufficiently large to restrain the occupant regardless of where he may be seated along the width of the vehicle and to provide a diffuser member, relatively smaller, which will occupy the considerably smaller storage space available within the dash panel or steering column. As indicated earlier, this is not possible with the vehicle safety assembly of application Ser. No. 621,845 because the fluid entering the confinement as it expands must travel essentially perpendicular to the longitudinal axis of the diffuser member, thereby causing the "effective" length of the diffuser to be the same as the length of the confinement.

A second disadvantage associated with utilizing a diffuser member having slots which possess sidewalls which are essentially perpendicular to the longitudinal axis of the diffuser member is that the frontal velocity of the pressurized escaping fluid passing through the slots tends to be high, and in some instances higher than is necessary for the given time-expansion requirements which must be met by the expanding confinement. Thus, it is possible to occasionally have the confinement which, as it expands and advances at approximately the frontal velocity of the fluid passing through the diffuser member impact the occupant with a force larger than that which is required to safely restrain him during the crash or collision situation.

Accordingly, the instant invention provides a solution to these problems in that it has been discovered that it is possible to provide a relatively small diffuser member for use with a large confinement wherein the diffuser member is provided with "louvered" slots for distributing and preferentially directing the flow of fluid through the diffuser member into the confinement such that the flow through the diffuser member into the confinement such that the flow through the diffuser is no longer perpendicular with respect to the longitudinal axis of the diffuser as it passes through the slots of the diffuser. Thus, the effective length of the diffuser is increased while the frontal velocity of the confinement is reduced to a more acceptable occupant comfort level. Both of which results are accomplished at no sacrifice in the overall time required to fill a confinement of predetermined volume.

SUMMARY OF THE INVENTION

It is therefore the primary object of the present invention to provide an improved vehicle safety assembly adapted for mounting either within the dash panel or steering column of a vehicle wherein the length of the diffuser member of said assembly is less than the "effective" length of the confinement in its expanded operating condition and wherein said diffuser member has been provided with louvered slots for preferentially directing and distributing the fluid passing through the diffuser during a crash or collision situation.

It is a further object of this invention to provide a vehicle safety assembly having a diffuser member capable of directing the flow of fluid through a plurality of louvered slots to soften the impact of the confinement by reducing the frontal velocity of the confinement as it advances to restrain the occupants of a vehicle during a crash or collision situation.

Other objects and important features of the present invention will be apparent from a study of the specification and accompanying drawings, which together show, illustrate, describe and disclose several embodiments or modifications of the invention, and what is now considered to be the best modes of practicing the principles thereof. Other embodiments or modifications may be suggested to those having the benefits of the teachings herein, and such other embodiments or modifications are intended to be reserved especially as they fall within the scope and spirit of the subjoined claims.

DESCRIPTION OF THE INVENTION

Figure 1:
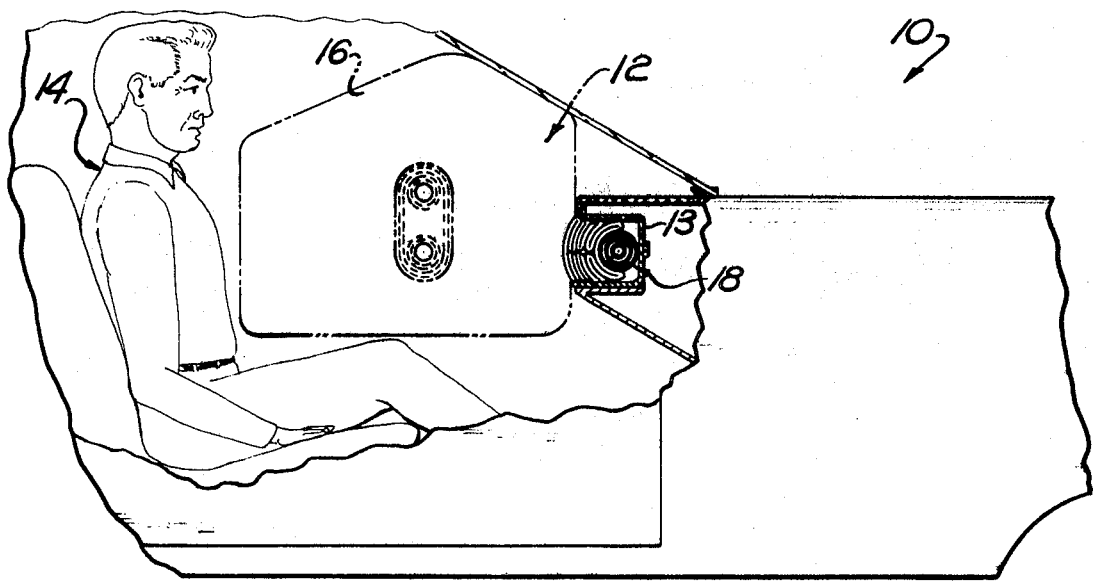
FIG. 1 is a partial fragmentary view of a vehicle in which a preferred embodiment of the vehicle safety assembly of the present invention may be advantageously used.

Referring now to the drawing wherein like numerals indicate like or corresponding parts throughout the several figures, a vehicle is generally shown at 10 in combination with a vehicle safety assembly 12 shown mounted within the dash panel 13 of the vehicle for protecting the occupant 14 of the vehicle during an accident situation. The assembly 12, as shown, includes an inflatable confinement or bag 16 and a means for inflating the bag generally shown at 18.

As is explained in further detail in U.S. application Ser. No. 621,845, the means 18 inflates the bag 16 from a normally stored collapsed, folded position within the dash panel 13 upon actuation of appropriate sensing means for detecting an accident or collision situation. The sensing means actuates an explosive charge which ruptures a wall of a fluid reservoir. The fluid reservoir contains pressurized fluid and upon being ruptured releases the fluid which in turn passes through a diffuser member which directs said fluid into the bag causing the bag to inflate or expand during a crash or collision situation and thereby prevents the occupant of the vehicle from moving forward and impacting against hard inner surfaces of the vehicle such as the instrument panel, the steering wheel, or the windshield.

Figure 2:
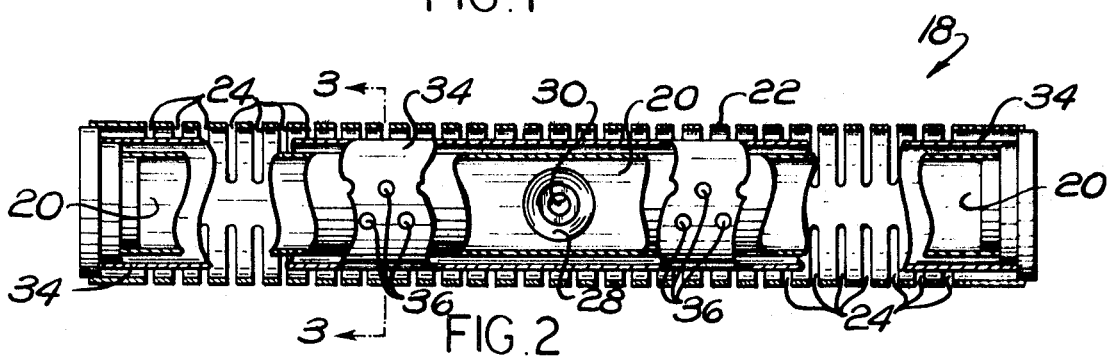
FIG. 2 is an enlarged cross-sectional view of the vehicle safety assembled disclosed in U.S. application Ser. No. 621,845.
Figure 3:
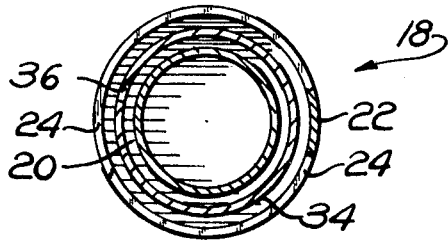
FIG. 3 is a sectional view taken along the line 3—3 of FIG. 2.

The means 18 disclosed and claimed in U.S. application Ser. No. 621,845 is reproduced herein as FIGS. 2 and 3 to illustrate one means of rapidly inflating a confinement. In FIGS. 2 and 3, the means 18 comprises a fluid source means 20 which is in communication with the bag 16 and, in the illustrated embodiment, comprises a reservoir which stores pressurized fluid for inflating the bag during a vehicle crash or collision. The fluid source means generally indicated at 20 is associated with an outer or diffuser member 22 which is disposed about the fluid source means 20 for controlling the flow of fluid therefrom and to the bag 16. The diffuser member 22 has a plurality of opening spaced along the longitudinal axis thereof and in the form of shaped elongate, narrow rectangular slots 24 through which the fluid from the fluid source means flows to inflate the bag 16. As illustrated in FIG. 2, the diffuser member 22 is an elongate member and the slots 24 generally extend transverse to the longitudinal axis thereof. The slots 24 are in a surface of the diffuser which faces generally toward the occupant and the slots or openings may be said to face in a similar direction.

Support means 28 are provided for supporting an explosive means 30 which functions to open the reservoir 20 upon actuation by appropriate sensing means (not shown) capable of sensing a vehicle collision. The explosive support means 28 confines and directs the energy resulting from the actuation of the explosive means 30 so as to direct the energy of the explosion against the reservoir 20 and thereby allowing the escape of the pressurized fluid therefrom. Limiting means 34 intermediate the reservoir 20 and diffuser member 22 may be provided for controlling the formation of the opening in the resulting reservoir 20 from the actuation of the explosive means 30. Pressurized fluid flows rapidly from the reservoir 20 and passes through a plurality of openings 36 in the limiting means 34 and through the slots 24 of the diffuser member 22 to inflate the confinement 16.

Figure 5:
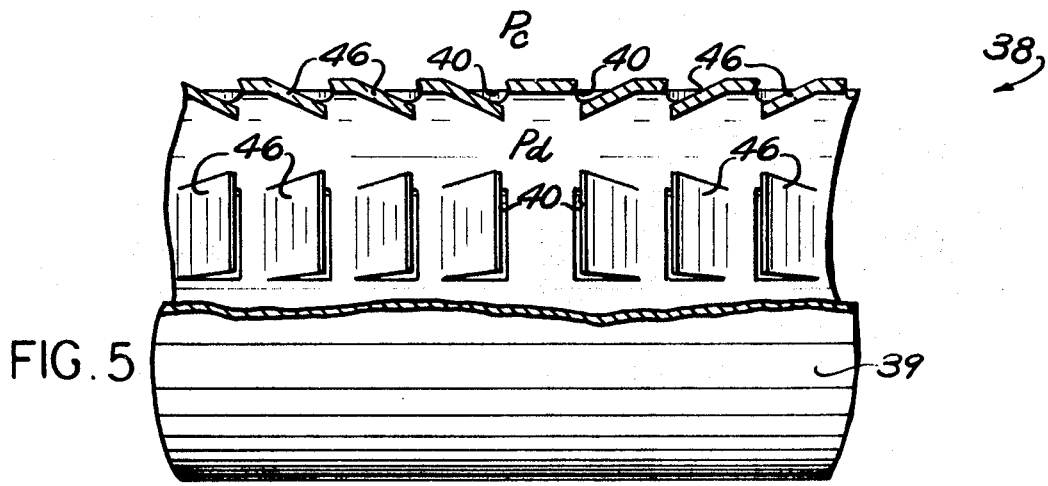
FIG. 5 is a partial sectional view of the louvered slots of the diffuser member of the improved vehicle safety assembly taken along the line 5—5 of FIG. 3.
Figure 7:
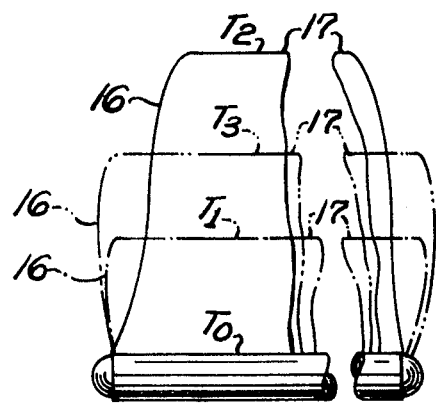
FIG. 7 is a schematic view illustrating the shape of the confinement of a prior art vehicle safety assembly as it travels forward during expansion.

It will be noted that the walls of the slots 24 are transverse and perpendicular to the longitudinal axis of the diffuser 22. Therefore, as seen in FIG. 5, the fluid passing through the slots will move perpendicularly away from the longitudinal axis of the diffuser 22. As a result, the effective length of the confinement or bag 16 is generally the same as the length of the diffuser member 22. As seen in FIG. 7, at time T1 the bag is moved in a generally perpendicular manner from the diffuser. At time T2 the movement of the confinement is still in generally the same perpendicular manner and as a result of the high frontal velocity of the confinement due to flow of fluid into the confinement, the confinement moves to and in some instances beyond the desired final position of the confinement at T3.

This high velocity movement of the confinement to the position shown in FIG. 7 at T2 may result in undue impact of the confinement 16 with a vehicle occupant and further may result in highly undesirable and destructive effects on the confinement itself, such effects may include a rupture of the confinement due to stressing of the confinement beyond the yield point of the confinement material or rupture of the confinement due to an onset of strain at a rate beyond the endurable strain rate of the confinement material. Therefore, it is apparent that a reduction in the frontal velocity of the confinement is a highly desirable and beneficial objective.

However, in reducing the frontal velocity of the confinement 16, it is requisite that the overall time to entirely fill the confinement to a predetermined pressure be maintained. Therefore, no decrease in volume flow rates of fluid into the confinement may be permitted.

Figure 9:
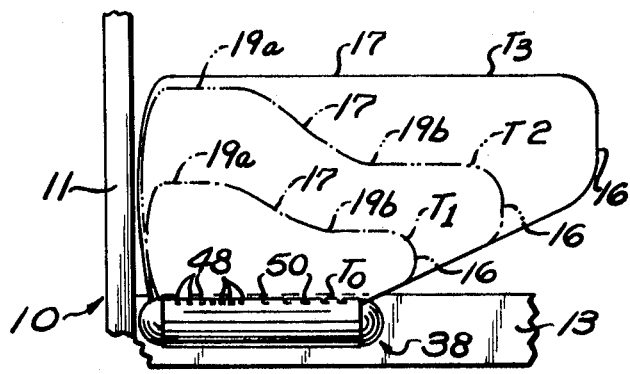
FIG. 9 schematically illustrates a second embodiment of the diffuser member and confinement of the present invention as it travels forward during expansion.
Figure 8:
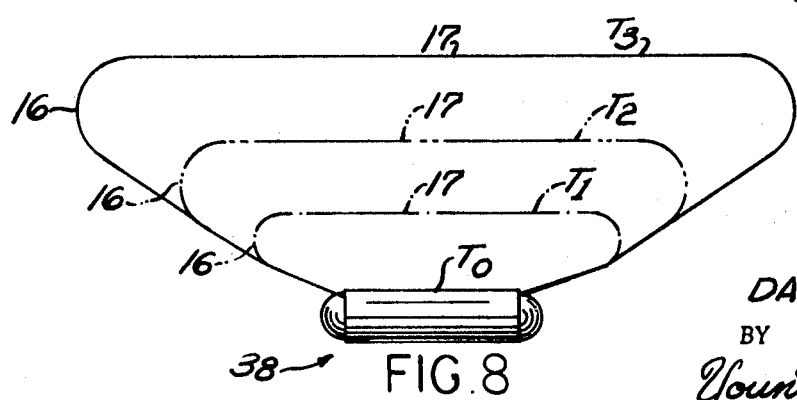
FIG. 8 illustrates schematically the diffuser member and confinement of the present invention as it travels forward during expansion.

In FIGS. 7, 8 and 9, times T1, T2 and T3 are used to indicate common time intervals after the initiation of inflation of the confinement 16. This being true, a ready comparison of the embodiment of FIG. 7 with the improved diffuser design of the present invention and the effect on frontal velocity of the confinement 16 may be made. In FIG. 7 and as was indicated above, a high frontal velocity of the confinement 16 has the effect of greatly increasing the extension of the confinement in a direction toward an occupant in a unit of time, such as T2–T1, over the diffuser member of the present invention as schematically illustrated in FIGS. 8 and 9. In fact, the hight frontal velocity results in extension of the confinement at T2 in FIG. 7 to a position beyond the final position of T3 and to such an extent that the confinement in FIG. 7 is likely to impact an occupant at an injury producing velocity.

Figure 4:
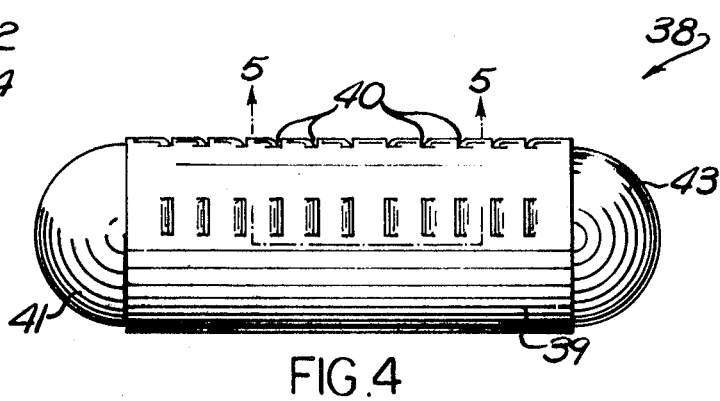
FIG. 4 is a side elevational view of the diffuser member of the improved vehicle safety assembly.

A further disadvantage of the prior art, as schematically shown in FIG. 7, is that of having to size the length of the confinement to correspond with the length of the diffuser member. As a result thereof, there is no difference between the actual length of the diffuser and the "effective" length thereof. It has been found that in order to adequately protect the occupants of the vehicle it is necessary to install a diffuser member of the type shown in FIGS. 2, 3 and 7 which will substantially correspond to the length of the dash panel or to utilize a plurality of diffuser members the total length of which will correspond to the length of the panel. Unfortunately, due to instrumentation in the dash panel, the housing of the heater unit and other equipment upon or in the dash panel it has not been possible to provide adequate space for a diffuser member of diffuser members having a length which correspond to the length of the dash panel. To overcome this problem, the diffuser member illustrated in detail in FIGS. 4, 5 and 6 has been developed.

Figure 6:
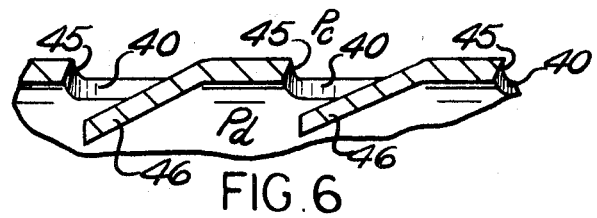
FIG. 6 is an enlarged view showing in greater detail the louvered slots of FIG. 5.

This diffuser member 38 of FIGS. 5 and 6 comprises an elongate cylinder 39 which is closed by opposite semispherical end portions 41 and 43. Punched into the wall of the elongate cylinder 39 is a plurality of openings 40. These openings are generally transverse to the longitudinal axis of the elongate cylinder 39 but differ from the diffuser member 22 illustrated in FIGS. 2 and 3 in that the side walls are not perpendicular to the longitudinal axis of the elongate cylinder 39.

Moreover, as can be best seen in FIGS. 5 and 6, the openings 40 as punched through the elongate cylinder 39 have sidewalls 45 which are generally not perpendicular to the longitudinal axis of the elongate cylinder 39. The openings 40 have a generally rectangular configuration when viewed in plan for the reasons described in copending application Ser. No. 621,845. The punching which produces the openings also produces louver or baffle 46 which is bent inwardly into the elongate cylinder 39 and which is likewise not perpendicular to the longitudinal axis of the diffuser member 38. The baffles or louvers 46 actually are coextensive with a part of the openings 40 with which they are associated. During an accident, fluid escaping through the openings 40 will assume a direction of travel which corresponds to the angle of the sidewalls 45 and of the baffle 46. Thus, the flow of fluid from the diffuser member 38 is not perpendicular to the longitudinal axis of the diffuser member 38 even though the openings 40 face toward the occupant.

The mechanism by which directional control over the fluid flow is accomplished is illustrated by further reference to FIGS. 5 and 6. Upon opening of the fluid pressure reservoir, there exits during the time of confinement inflation, that is, from T1 to T3, a pressure drop across the diffuser member 38. The pressure Pd within the diffuser 38 is higher than the pressure Pc immediately without the diffuser 38 in confinement 16. Due to the pressure drop Pd–Pc across the openings 40, the fluid will, of course, flow into the confinement 16 and cause inflation thereof. The sidewalls 45 and 46 will impart direction to the fluid as it flows into the confinement. The direction of the fluid flow from the diffuser 38 is according to the principles of this invention at an acute angle with the longitudinal axis of the diffuser.

The fluid leaving the diffuser 38 at a high velocity due to the pressure drop Pd–Pc across the diffuser impacts and initiates inflation of the confinement in a direction generally sidewise of the direction of frontal movement of the confinement face 17. Thus the "effective" length of the diffuser 38 is increased and further the frontal velocity of the confinement face 17 is reduced while the elapsed time necessary to completely fill the confinement is maintained at a minimum.

As can best be seen in FIG. 8 wherein a diffuser member 38 and confinement 16 are illustrated, the flow of gas is outwardly and away from the diffuser member 38 at an acute angle with respect to the longitudinal axis of the diffuser member which enables the vehicle assembly to utilize a confinement 16 having a length greater than the length of the diffuser member 38. In other words, it is not necessary to size the length of the confinement to correspond to the length of the diffuser member. As can be seen at the various times T1, T2 and T3 the confinement moves at an acute angle with respect to the longitudinal axis of the diffuser member 38. Therefore, it is now possible to house within the dash panel or within the steering column or elsewhere in the vehicle, a diffuser member having relatively a small length and still provide in a crash or collision a confinement which when inflated has a satisfactory length.

Further from a comparison of FIGS. 7 and 8 it can be seen that the frontal velocity of the confinement 16 has been substantially reduced. In FIG. 8, it can be seen that inflation of the confinement is effected such that the sequence of inflation is progressive and at times T1 and T2 the front face 17 of the confinement 16 is moving toward the fully inflated position at T3. The front face 17 of the confinement 16 also does not advance beyond the final confinement position at T3 as was the case with the prior art diffuser of FIG. 7. In FIG. 8, the primary quantity of fluid flow, undiminished from the quantity of fluid flow in FIG. 7 is, has been directed laterally with respect to the forward movement of the confinement face 17. This deflection of fluid flow functions to increase the "effective" length of the diffuser member 38 and to substantially reduce the frontal velocity of the confinement face 17 with no increase in the time period necessary to completely fill the confinement 16 to the position indicated at T3.

From the above, it should be apparent that the louvered diffuser member 38 accomplishes the stated objectives of the instant application, which are to lessen the frontal velocity of the confinement to lessen impact of the confinement with the occupant and prevent rupture of the confinement from excessive stress due to stretching of the confinement beyond the yield point of the confinement material, and prevent rupture of the confinement from an extremely high rate of onset of strain in the confinement material; also accomplished is the complete inflation within the required time period of the confinement from a fluid pressure source having a minimum length, stated otherwise, the flow characteristics of the diffuser member 38 of the present invention as such as to increase the "effective" length of the diffuser.

As can be seen in FIG. 9 it is also possible to utilize a diffuser member having slots which are generally perpendicular to the axis of the diffuser member in combination with "louvered slots" which are canted at an acute angle with respect to the longitudinal axis of the diffuser member. This results in enabling the vehicle safety assembly to utilize a confinement 16 having a shape when inflated as illustrated at T3 in FIG. 9. This makes it possible to utilize the diffuser member adjacent the sidewalls of the vehicle such that the bag when being inflated will have a portion thereof moving generally parallel to the sidewall and a second portion thereof moving generally away from the sidewall to provide adequate protection for the occupant or occupants even though they are not seated directly in front of the diffuser member.

As a further feature of the embodiment of FIG. 9, due to the unequal frontal velocities of the face 17 of the confinement 16 during the period of inflation from T0 to T3, it is possible to accomplish control over the configuration of the confinement 16 during inflation thereof. The diffuser member 38 in the embodiment of FIG. 9 provides this control, and has a series of slots 48 therein which are generally perpendicular to the longitudinal axis of the diffuser member 38 and a series of openings 50 canted at an acute angle with respect to the longitudinal axis of the diffuser member 38. The diffuser member 38 of FIG. 9 is shown mounted in the dash panel 13 of the vehicle 10 adjacent a sidewall 11 thereof. The difference in the frontal velocity of portions 19a, 19b of the front face 17 of the confinement 16 at times T1 and T2 causes the confinement 16 to present, with respect to an occupant of the vehicle 10, a barrier having a generally sloping surface from the sidewall 11 of the vehicle 10 toward the dash panel 13. The result of this sloping surface is to lessen the possibility of the occupant being impacted by a collision into the corner defined by the sidewall 11 and dash panel 13 and thereby avoiding the benefits of the confinement and further to urge a shift in the occupant's collision initiated forward movement away from the sidewall 11 and into the body of the confinement 16 where maximum occupant protection is available. The fully inflated confinement 16, shown at time T3, is, however, not particularly configured and will assume a generally planar surface at the front confinement face 17.

While the invention has been shown, illustrated, described and disclosed in terms of embodiments or modifications which it has assumed in practice, the scope of the invention should not be deemed to be limited by the precise embodiment or modifications herein shown, illustrated, described or disclosed, such other embodiments or modifications intended to be reserved especially as they fall within the scope of the claims here appended.

I claim:

1. Safety apparatus for protecting an occupant of a vehicle, said safety apparatus comprising a confinement having a collapsed inoperative condition and an expanded operative condition, said confinement when in the operative condition being effective to restrain movement of an occupant of the vehicle during an accident, a fluid supply for expanding said confinement, means operable to provide for flow of fluid from said supply, a member located in the path of flow of fluid from said supply, said member having a plurality of spaced-apart openings in a portion thereof and through which fluid flows, said openings being arranged to discharge the fluid directly into the interior of said confinement, and louver means associated with said openings and extending at an acute angle to said portion and operable to direct the flow therethrough, said member being of a generally cylindrical configuration and said openings being spaced along the longitudinal axis thereof, said louver means comprising separate baffles associated with each opening in said member and which have a portion which is coextensive with said opening and which direct the flow at an acute angle to the longitudinal axis of said member, and said separate baffles extending into the interior of said member.

2. Safety apparatus as defined in claim 1 wherein said member has a main body portion and said baffles comprise integral portions of said member which are bent out of the plane of the main body of the member to provide said openings therein.

3. Safety apparatus for protecting an occupant of a vehicle, said safety apparatus comprising a confinement having a collapsed inoperative condition and an expanded operative condition, said confinement when in said operative condition being effective to restrain movement of an occupant of the vehicle during an accident, a fluid supply for expanding said confinement, means operable to provide for flow of fluid from said supply, a member having a longitudinal axis and located in the path of fluid flow from said supply, said member having a plurality of openings spaced along the longitudinal axis thereof with said openings being arranged to discharge the fluid directly into the interior of said confinement, and means associated with said openings for directing the flow of fluid from said openings at an acute angle to the longitudinal axis of said member, said last-recited means comprising louver means associated with at least certain of the openings for directing the flow at said acute angle, said louver means comprising separate baffles associated with each opening in said member and each of which has a portion which is coextensive with the associated opening, and said member is generally cylindrical and said separate baffles extend into the interior of said member and direct the flow at an acute angle to the axis of the member.

4. Safety apparatus as defined in claim 3 wherein said member has a main body portion and said baffles comprise integral portions of said member which are bent out of the plane of the main body of the member in order to define said openings.

5. Safety apparatus for protecting an occupant of a vehicle, said safety apparatus comprising a confinement having a collapsed inoperative condition and an expanded operative condition, said confinement when in said operative condition being effective to restrain movement of an occupant of the vehicle during an accident, a fluid supply for expanding said confinement, means operable to provide for flow of fluid from said supply, a member having a longitudinal axis and located in the path of fluid flow from sad supply, said member having a plurality of openings spaced along the longitudinal axis thereof with said openings being arranged to discharge the fluid directly into the interior of said confinement, and means associated with said openings for directing the flow of fluid from said openings at an acute angle to the longitudinal axis of said member, and the width of said confinement when inflated is substantially greater than the length of that portion of said member in which said openings are formed.

6. In a safety apparatus for protecting an occupant of a vehicle and which apparatus comprises a confinement having a collapsed inoperative condition and an expanded operative condition, the confinement when in the operative condition being effective to restrain movement of an occupant of the vehicle during an accident, a fluid supply for expanding said confinement, means operable to provide for flow of fluid from said supply, and a member located in the path of flow of fluid from said supply and which member has a plurality of spaced-apart openings in a portion thereof and through which fluid flows, with said openings being arranged to discharge the fluid directly into the interior of said confinement, and the width of the confinement when inflated being substantially greater than the length of that portion of the member in which the openings are formed, the improvement comprising louver means associated with a plurality of the openings in the member and extending at an acute angle to said portion and operable to direct the flow therethrough.

PO-1050
(5/69)

UNITED STATES PATENT OFFICE
CERTIFICATE OF CORRECTION

Patent No. 3,602,526              Dated August 31, 1971

Inventor(s) Darrell S. Brawn

It is certified that error appears in the above-identified patent and that said Letters Patent are hereby corrected as shown below:

Col. 2, lines 9 and 10:   Delete "into the confinement such that the flow through the diffuser member".

Col. 2, line 55:   "assembled" should read---assembly---.

Col. 3, line 52:   After "20" insert---for opening the reservoir 20---.

Signed and sealed this 18th day of January 1972.

(SEAL)
Attest:

EDWARD M. FLETCHER, JR.            ROBERT GOTTSCHALK
Attesting Officer                  Acting Commissioner of Patents